(12) United States Patent
Kislal et al.

(10) Patent No.: US 12,399,893 B2
(45) Date of Patent: Aug. 26, 2025

(54) QUESTION-ANSWERING SYSTEM FOR ANSWERING RELATIONAL QUESTIONS BY UTILIZING TWO PATHS WHERE AT LEAST ONE PATH USES BERT MODEL

(71) Applicant: Pryon Incorporated, Raleigh, NC (US)

(72) Inventors: Ellen Eide Kislal, Leawood, KS (US); David Nahamoo, Great Neck, NY (US); Vaibhava Goel, Chappaqua, NY (US); Etienne Marcheret, White Plains, NY (US); Steven John Rennie, Yorktown Heights, NY (US); Chul Sung, Fort Lee, NJ (US); Marie Wenzel Meteer, Arlington, MA (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 18/619,299

(22) Filed: Mar. 28, 2024

(65) Prior Publication Data
US 2024/0241880 A1 Jul. 18, 2024

Related U.S. Application Data

(63) Continuation of application No. PCT/US2023/027315, filed on Jul. 11, 2023.
(Continued)

(51) Int. Cl.
*G06F 16/2452* (2019.01)
*G06F 16/248* (2019.01)
(Continued)

(52) U.S. Cl.
CPC ...... *G06F 16/24522* (2019.01); *G06F 16/248* (2019.01); *G06F 16/3329* (2019.01);
(Continued)

(58) Field of Classification Search
CPC .......... G16H 40/20; G06N 3/08; G06N 3/044; G10L 25/54
See application file for complete search history.

(56) References Cited

U.S. PATENT DOCUMENTS

| | | | |
|---|---|---|---|
| 7,254,545 | B2 | 8/2007 | Falcon et al. |
| 8,024,338 | B2 | 9/2011 | Brei |

(Continued)

FOREIGN PATENT DOCUMENTS

| | | |
|---|---|---|
| CN | 111897937 A | 11/2020 |
| CN | 112199254 A | 1/2021 |

(Continued)

OTHER PUBLICATIONS

International Search Report and Written Opinion, PCT Application No. PCT/US2023/027315, mailed Oct. 30, 2023 (10 pages).
(Continued)

*Primary Examiner* — Farzad Kazeminezhad
(74) *Attorney, Agent, or Firm* — Occhiuti & Rohlicek LLP

(57) ABSTRACT

A question-answering system that receive a natural-language question includes a database to provide a basis for that answer and a structured-query generator that constructs a structured query from the question and uses it to obtain an answer to the question from the database. The method further comprises generating a first answer to said first question, wherein generating said first answer comprises causing said question to traverse a first path through said question-answering system, wherein the first path comprises a knowledge base constructed from content of the document collection using a machine learning BERT model; and causing said question to traverse a second path through said question-answering system to generate a second answer to said question, said second answer differing from said first answer, wherein the second path comprises a structured
(Continued)

query generator and the database, the database being distinct from the knowledge base.

19 Claims, 2 Drawing Sheets

Related U.S. Application Data

(60) Provisional application No. 63/423,527, filed on Nov. 8, 2022, provisional application No. 63/388,046, filed on Jul. 11, 2022.

(51) Int. Cl.
| | |
|---|---|
| *G06F 16/3329* | (2025.01) |
| *G06F 40/30* | (2020.01) |
| *G06N 3/044* | (2023.01) |
| *G06N 3/08* | (2023.01) |
| *G06N 5/04* | (2023.01) |
| *G06N 20/00* | (2019.01) |
| *G06V 30/414* | (2022.01) |
| *G10L 25/54* | (2013.01) |
| *G16H 40/20* | (2018.01) |

(52) U.S. Cl.
CPC .............. *G06F 40/30* (2020.01); *G06N 5/04* (2013.01); *G06N 20/00* (2019.01); *G06V 30/414* (2022.01)

(56) References Cited

U.S. PATENT DOCUMENTS

| | | | |
|---|---|---|---|
| 8,478,780 | B2 | 7/2013 | Cooper et al. |
| 11,010,284 | B1 | 5/2021 | Santiago et al. |
| 11,080,336 | B2 | 8/2021 | Van Dusen |
| 11,561,987 | B1 | 1/2023 | Sager et al. |
| 2007/0150458 | A1 | 6/2007 | Chung et al. |
| 2007/0288439 | A1 | 12/2007 | Rappaport et al. |
| 2008/0270380 | A1 | 10/2008 | Ohrn et al. |
| 2011/0196852 | A1 | 8/2011 | Srikanth et al. |
| 2012/0078873 | A1 | 3/2012 | Ferrucci et al. |
| 2014/0304250 | A1 | 10/2014 | Sankar et al. |
| 2015/0178853 | A1 | 6/2015 | Byron et al. |
| 2016/0364377 | A1 | 12/2016 | Krishnamurthy |
| 2017/0024465 | A1* | 1/2017 | Yeh .......................... G10L 25/54 |
| 2017/0060990 | A1* | 3/2017 | Brown .................... G16H 40/20 |
| 2017/0308531 | A1 | 10/2017 | Ma et al. |
| 2017/0344640 | A1 | 11/2017 | Goldstein et al. |
| 2018/0046764 | A1 | 2/2018 | Katwala et al. |
| 2018/0143975 | A1 | 5/2018 | Casal et al. |
| 2018/0189630 | A1 | 7/2018 | Boguraev et al. |
| 2018/0232376 | A1 | 8/2018 | Zhu et al. |
| 2018/0260738 | A1 | 9/2018 | Gabbai et al. |
| 2019/0042988 | A1 | 2/2019 | Brown et al. |
| 2020/0257679 | A1* | 8/2020 | Sheinin .................... G06N 3/08 |
| 2021/0022688 | A1* | 1/2021 | Lee .......................... G06N 3/044 |
| 2021/0097405 | A1 | 4/2021 | McNeil et al. |
| 2021/0157975 | A1 | 5/2021 | Gelosi |
| 2021/0287141 | A1 | 9/2021 | Molloy et al. |
| 2021/0319066 | A1 | 10/2021 | Boxwell et al. |
| 2021/0365481 | A1 | 11/2021 | Chen |
| 2021/0397609 | A1 | 12/2021 | Yurtsev et al. |
| 2021/0406264 | A1 | 12/2021 | Nahamoo et al. |
| 2021/0406735 | A1 | 12/2021 | Nahamoo et al. |
| 2024/0135291 | A1 | 4/2024 | Steenstra et al. |
| 2024/0154941 | A1 | 5/2024 | Nagpal et al. |

FOREIGN PATENT DOCUMENTS

| | | | |
|---|---|---|---|
| CN | 114090760 A | | 2/2022 |
| KR | 100347799 B1 | | 8/2002 |
| KR | 10-2019-0079805 A | | 7/2019 |
| KR | 10-2019-0118744 A | | 10/2019 |
| KR | 10-2022-0083450 A | | 6/2022 |
| WO | WO 88/10470 | * | 6/1987 ............. G06F 15/18 |

OTHER PUBLICATIONS

Tianwei Xing et al., DeepSQA: Understanding Sensor Data via Question Answering. In Proceeding of the International Conference on the Internet-of-Things Design and Implementation. Association for Computing Machinery, 106-118. <https://doi.org/10.1145/3450268.3453529>, May 2021.

* cited by examiner

QUESTION-ANSWERING SYSTEM FOR ANSWERING RELATIONAL QUESTIONS BY UTILIZING TWO PATHS WHERE AT LEAST ONE PATH USES BERT MODEL

CROSS-REFERENCE TO RELATED APPLICATIONS

This application is a continuation of International Application No. PCT/US2023/027315, filed on Jul. 11, 2023, which claims the benefit of U.S. Provisional Application No. 63/423,527, filed on Nov. 8, 2022, and claims the benefit of U.S. Provisional Application No. 63/388,046, filed on Jul. 11, 2022. The entire contents of these applications are incorporated herein by reference in their entirety.

BACKGROUND OF THE INVENTION

The invention pertains to question-answering ("QA") systems, and in particular, to natural-language question-answering systems.

As its name suggests, a question-answering system receives questions. These questions are either written or spoken. In the case of a "natural-language" question-answering systems, the questions are in the form one might use when speaking to another person. Such questions are referred to as "natural language" questions.

In response to a question, the question-answering system provides an answer. A natural-language question answering system attempts to provide a natural-language answer.

A natural-language question-answering system thus creates the impression of interacting with a human being. In part because of this and their overall ease of use, such systems are often used by organizations to answer questions within a limited domain of knowledge.

To provide such answers, the question-answering system relies on a knowledge base. The knowledge base is compiled from numerous documents that include information relevant to a particular domain of knowledge. In some examples, a QA system retrieves an answer found as a "segment" in a document of the knowledge base. An example of such a segment is a sequence of words.

The ease with which a question can be answered depends in part on the nature of the documents used to build the knowledge base and on the nature of the questions.

Certain types of documents include considerable structure. This structure promotes the ease with which information can be located. In the world of books, examples include encyclopedias and dictionaries. Other documents have less structure. As an example, some books only have a table of contents. Yet other documents consist of free-flowing prose and are thus effectively unstructured.

A particularly structured document is one that includes a table. A table inherently includes a great deal of structure in the form of rows and columns.

As noted above, the ease with which information can be found also depends on the nature of the question itself.

A first type of question asks about the nature of a particular entity. Examples include such questions as, "What type of battery does one use for the model GX infrared goggles?" or "At what core temperature should the cadmium rods be inserted to prevent a meltdown of the reactor?" Information for answering such questions may be relatively easy to find even in an unstructured document.

Another type of question asks about relationships between entities. These are referred to herein as "relational questions." Such relational questions often begin with statements such as "How many . . . ," "Which one has the most . . . ," "What is the average . . . ," and "What is the total . . . ." Answering questions of this type may turn out to be difficult using only the tools available with a text-based knowledge base. For example, information that may be found in different documents or in different parts of a document may need to be combined to form an answer.

The distinction between these two types of questions is similar to the distinction between simply looking up an answer and looking up information from which one can derive the answer. While modern question-answering systems respond to questions of the first type with ease, responding to questions of the second type, i.e., to relational questions, is a different matter altogether.

Conventional question-answering systems offer some limited flexibility in controlling a search for information. For example, one can use Boolean operators to limit the set of all possible answers. As an example, a user who is shopping for shirts might click on "Long Sleeves" as a filter to constrain the answer space.

However, Boolean operators of this type are difficult to use for carrying out simple operations like obtaining an average or identifying the largest number in set of numbers.

SUMMARY OF THE INVENTION

A question-answering system includes a corpus of information that can be used to form answers to questions. This corpus includes a "knowledge base." A knowledge base is formed from a set of ingested documents. These documents contain information to be used in forming answers to questions. The documents include human-readable documents, such as text files and files in a portable document format.

These ingested documents have varying amounts of structure that promotes locating of an answer. The system responds to questions from users by using a statistical model to identify an answer that is most likely given the question.

In one aspect, an approach to implementing a question-answering is based in large part on the recognition that answering relational questions can be more easily carried out by capitalizing on a database management system's inherent ability to carry out complicated searches.

A question-answering system as described and claimed herein thus solves the technical problem of allowing a natural language query, which might normally be used to retrieve a segment from the knowledge base, to cross over into an equivalent structured query that is directed to a database, for instance a relational database, which is formed from the knowledge base. This makes it possible to leverage a database management system's ability to carry out cross-answer comparisons of the type that are often useful for answering relational questions. In effect, the solution to the foregoing technical problem includes incorporating a database within the question-answering system and transforming the natural-language question into a database query that is then used to interrogate that database. The result of this query may then be optionally transformed into a natural language answer that is then provided to the user.

Thus, an improvement in a question-answering system's ability to answer relational questions arises from constructing a database from the same documents that were used to build the knowledge base. This results in an information corpus that includes both the knowledge base and a database that is separate from the knowledge base. In some embodiments, these documents are natural-language documents.

Examples of such natural-language documents include manuals, and specification or instruction sheets.

With this having been carried out, it becomes possible to receive a natural-language query and to provide it to both the knowledge base and to the database.

Providing the natural-language query to the database includes using a structured query generator to derive a structured query that is both equivalent to the natural language query and executable by a database management system. This derived query can then be used to interrogate the database (e.g., a relational database, a columnar data store, etc.). For instance, a structured query language (SQL) query may be automatically formed from a natural language query to interrogate a relational database referencing one or more tables in the database.

The foregoing method makes it possible to leverage the logic inherent in a structured query language.

For example, suppose that the documents in question are resumés. In such a case, the question-answering system might receive a natural language question such as, "How many candidates have a PhD?"

If one only has a knowledge base with resumes, answering this question requires defining a counter, inspecting each resumé, and then incrementing the counter each time a resumé shows a PhD. This is a laborious process.

On the other hand, if one has previously transformed the resumés into a relational database in which each record includes a field such as "candidate" or "degree," it is a simple matter to issue a command in an appropriate structured query language to obtain the answer.

Accordingly, the question-answering system translates the question into a logically equivalent SQL query, such as: "SELECT COUNT (candidate) WHERE degree LIKE '% PhD %'." This takes advantage of the built-in counting function that is typically available in a database management system, such as one that recognizes SQL commands.

The invention results in a hybridized question and answering system that capitalizes on the database management system's inherent ability to respond to a query in a structured query language to perform a variety of comparisons that would be difficult to implement in a system that only has a knowledge base.

Since the knowledge base and the database are different, it is reasonable to expect that a question posed to one would result in an answer that differs from that resulting from having posed the same question to the other. To reconcile the answers provided using the knowledge base and those that result from having used the database, it is useful to provide an orchestrator that receives both answers and selects from among them to provide an appropriate answer for output.

To make a final decision on which answer to output in response to a question, the orchestrator relies on scores associated with the various answers. An example of such a score is one that is indicative of a posteriori probability of the answer's correctness or some metric of confidence in correctness of an answer. The orchestrator then uses the scores as a basis for deciding which answer to present.

The invention thus includes two main steps. A preparatory step, which takes place prior to putting the question-answering system into service (or may be repeated or augmented from time to time while in service), and a run-time step, which is carried out when, after having been prepared in the preparatory step, the question-answering system receives a question from a user.

The preparatory step includes using information in documents provided to the question-answering system to construct a structured database along particular dimensions (i.e., with particular database schema). This preparatory step would be carried out before the question-answering system is put into use. The run-time step occurs during use.

Some practices include augmenting the aforementioned structured database dynamically based on user questions. For example, suppose that a structured database as described above includes information about laptops. Suppose that the schema for this database includes a table with columns for "Cost," "Memory," and "RAM" for these different laptops. Suppose further that the question-answering system receives a user question that inquires about the weights of different laptops. In these practices, the preparatory step further includes using this information from the user question as a basis for dynamically adding a "Weight" relation to the schema.

The run-time step includes converting a natural language query received from a user into a structured query and using that structured query to interrogate the database that was constructed during the preparatory step.

In one aspect, the invention features a question-answering system that receive a natural-language question. The question-answering system includes a database to provide a basis for a first answer to the question. The database is one that has been constructed from documents in a document collection. The question-answering system also includes a structured-query generator that constructs a query from the question. The query is in a structured query language. The structured-query generator then uses that query to obtain, using the database, the first answer.

Embodiments include those in which the documents are human-readable documents and those in which the documents are natural-language documents. Examples of such documents include text files and files in a portable document format (i.e., PDF files).

Other embodiments include those in which the database is a relational database and those in which the database includes a schema that is constructed based on said documents.

In some embodiments, the question-answering system generates a second answer to the question, the second answer being different from the first answer. Among these are embodiments in which the question-answering system includes a first path and a second path. In such embodiments, the question traverses the first path to generate the first answer and traverses the second path to obtain a second answer, which differs from the first answer.

Also among the embodiments are those in which the question-answering system further includes a knowledge base to provide a basis for a second answer to the question, the knowledge base having been compiled from the document collection. For instance, the system uses a machine learning approach to identify a segment of a document that contains an answer to the question.

Still other embodiments are those in which the question-answering system also includes an orchestrator that receives both the first answer to the question and a second answer to the question, the second answer differing from the first answer. This orchestrator is further configured to reject one of the first and second answers.

In still other embodiments, the question-answering system features a feature extractor and a database builder. The feature extractor receives the document collection and extracts features from documents in the document collection. It then provides those features to the database builder for incorporation as tables in the database.

Still other embodiments include those in which the first answer results from the question having traversed a first path through the question-answering system and the question-answering system includes a second path that is traversed by the question to generate a second answer that differs from the first answer. The first and second answers have first and second scores. An orchestrator of the question-answering system receives the first and second answers and the corresponding scores thereof and selects one of the first and second answers as an output answer based on the scores.

In another embodiment, the question-answering system also includes a first path that is traversed by the question to generate the first answer, a second path that is traversed by the question to generate a second answer that differs from the first answer, a feature extractor receives natural language documents from the document collection and extracts features from natural-language documents in the document collection, and a database builder that receives the features for incorporation as tables in the database, In such embodiments, the database is a relational database that comprises a schema that is constructed based on the documents.

In another aspect, the invention features a method that includes a question-answering system carrying out the steps of receiving a question, the question being a natural language question, constructing a query corresponding to the question, the query being a query in a database query language, providing the query to a database, the database having been constructed from documents in a document collection, receiving information from the database in response to having provided the query thereto, based on the information, generating a first answer to the question.

Among the practices of the method are those in which the documents are human-readable documents and those in which the documents are natural-language documents.

In some practices, the method further includes the question-answering system further carrying out the step of constructing the database based on the documents. Among these practices are those in which the database is a relational database and those in which the construction of the database includes constructing a schema for the database based at least in part on the documents.

Still other practices of the method include those in which the question-answering system generates a second answer to the question, the second answer being different from the first answer.

In further practices, the method also includes those in which the question-answering system causes the question to traverse a first path to generate the first answer and also causes the question to traverse a second path to generate a second answer that differs from the first answer.

Still other practices include those in which the question-answering system compiles a knowledge base based on the document collection and uses that knowledge base to provide a second answer to the question.

In some practices, the method further includes having the question-answering system receive a second answer to the question and reject one of the first and second answers. In such practices, the first and second answers differ from each other.

Still other practices are those in which the question-answering system receives the document collection, extracts features from documents in that document collection, and uses the features to build tables in the database.

Among the practices of the method are those in which generating the first answer includes causing the question to traverse a first path through the question-answering system. In such practices, the method further includes the question and answering system generating a score for the first question, causing the question to traverse a second path through the question-answering system to generate a second answer to the question, generating a score for the second question, and selecting one of the first and second questions as an output answer based on the scores thereof. In such embodiments, the first and second answers differ from each other.

Still other practices include constructing the database. Among these are practices in which constructing the database includes using the question-answering system to direct a question towards each of the documents and, based at least in part on answers to the questions, constructing a table for inclusion in the database. Also among these are practices in which constructing the database includes identifying a table in the documents and incorporating the table into the database.

These and other features of the invention will be apparent from the detailed description and the accompanying figures, in which:

DETAILED DESCRIPTION

Figure 1:
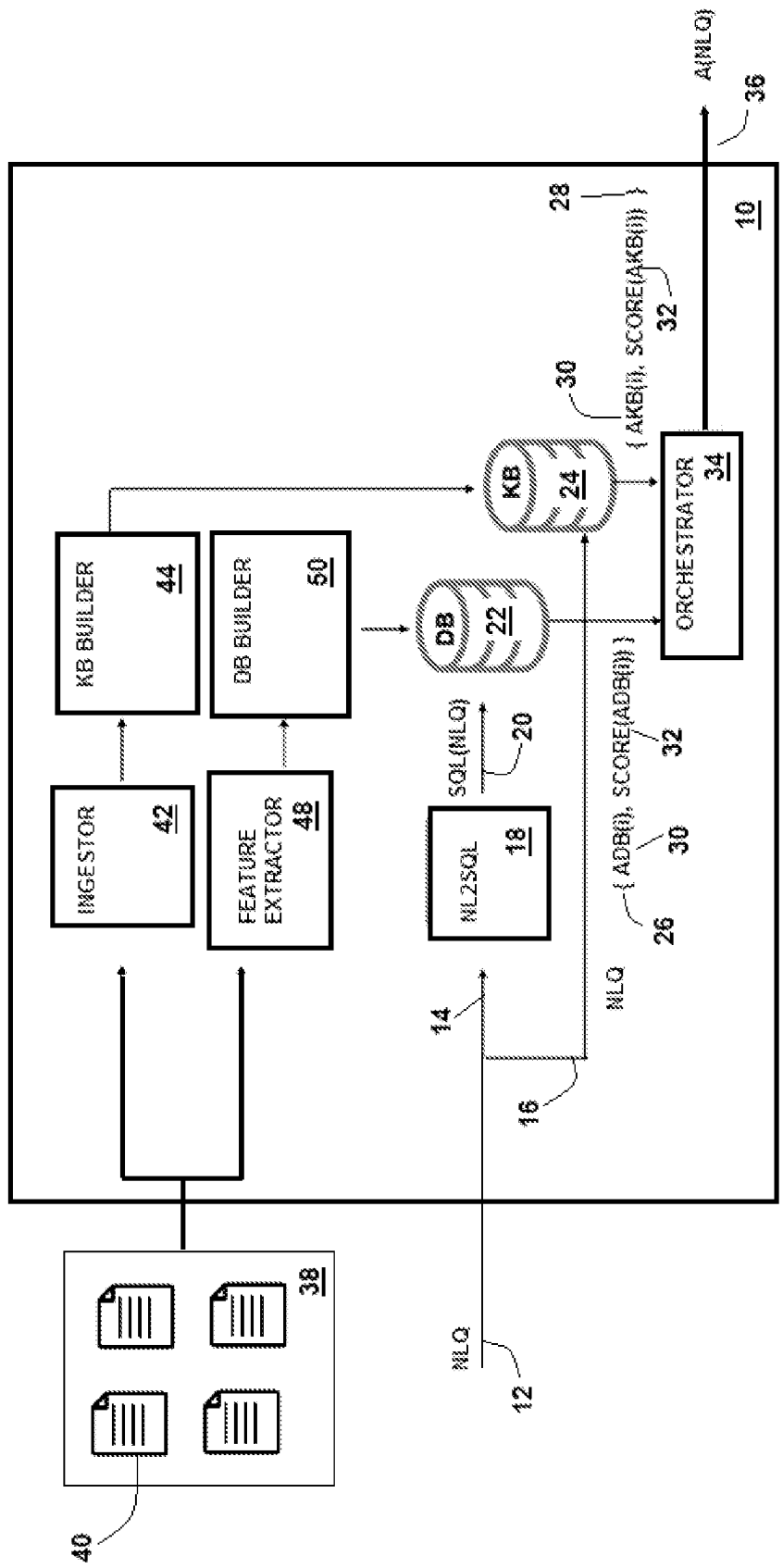
FIG. 1 shows an exemplary architecture of a question-answering system.

FIG. 1 shows a question-answering system 10 that receives a question 12 from a user. In particular, the question 12 is a natural-language relational question 12. Various aspects of the operation of the question-answering system 10 are described in WO2021/263138, published on Dec. 30, 2021, the contents of which are incorporated herein by reference.

The question-answering system 10 passes the question 12 along both a first path 14 and a second path 16, both of which pass through an information corpus 17.

The first path 14 includes a structured-query generator 18 that converts this question 12 into a structured query 20 suitable for interrogating a database 22, such as a relational database. The second path 16 retains the natural-language question 12 in its original form for use in interrogating a knowledge base 24.

The result of having interrogated the database 22 is a first candidate answer set 26. Similarly, the result of having interrogated the knowledge base 24 is a second candidate answer set 28. Both the first and second candidate sets 26, 28 comprise one or more candidate answers 30 and a score 32 corresponding to that candidate answer 30. A candidate answer's score 32 serves as a metric that is indicative of the probability that the candidate answer 30 is the correct answer to the question 12. An orchestrator 34 selects the candidate answer 30 having the highest score and outputs that candidate answer 30 as the output answer 36 as a response to the original question 12.

Both the database 22 and the knowledge base 24 are built using the same supply of documents 38. Optionally, the database 22 is in addition or instead built using documents other than documents 38 or is augmented with a data source (e.g., structured tabular data) that does not originate in document of the form of documents 38. The database 22 and the knowledge base 24 differ in how the information in the documents 38 is organized. As a result, the same question 12 can result in different answers depending on whether the knowledge base 24 or the database 22 was used to answer that question 12.

An enterprise seeking to use the question-answering system 10 would normally provide a document collection 38 that comprises documents 40.

The documents 40 are typically in different formats, examples of which include plain text, text that has been marked up for visual display, text with embedded figures, and content provided in a portable document format. In addition, the documents 40 have diverse structures, with some being minimally structured and some being extensively structured. These documents 40 are used as a basis for answering questions 12 both along the first path 14 and along the second path 16.

This document collection 38 serves as the raw material from which both the knowledge base 24 and the database 22 are constructed. Since the same question 12 may be answered differently depending on which of the first or second paths 14, 16 it uses, this would suggest that the knowledge base 24 and the database 22 must be constructed differently. In fact, this is the case.

The knowledge base 24 is constructed without significantly changing the content of the documents 40. As a result, a document's level of structure remains about the same. If a document 40 is relatively unstructured to begin with, it remains so in the knowledge base 24.

This is not so in the case of the database 22. The construction of the database 22 includes having a database builder 50 that distills the structure of each document 40 and incorporates that structure into tables within the database 22. This distillation process brings into focus certain types of information that are largely hidden when the documents 40 retain their original levels of structure. In particular, the distillation process inherent in constructing the database 22 tends to expose precisely the type of information needed to answer relational questions 12. As a result, the same question 12 will result in different answers depending on whether the answer resulted from the question having passed through the first path 14 or the second path 16.

In principle, it should not be necessary to actually pass a question 12 through both paths 14, 16 and to rely on the orchestrator 34 to choose an output answer 36 from amount the candidate answers 30. One should, in principle, be able to classify a question and determine a priori which of the two paths 14, 16 should be used.

To implement such an embodiment, the orchestrator 34 may be able to instead be located upstream to classify an incoming question 12 and direct it to one of the first and second paths 14, 16 based on a priori knowledge of which path 14, 16 would provide the better answer. The orchestrator 34 in both cases would be carrying out essentially the same function of choosing which path 14, 16 provides the answer, the difference being simply the difference between using a priori information in one case and a posteriori information in the other.

Constructing the knowledge base 24 includes passing the document collection 38 through an ingestor 42 and a knowledge-base builder 44. This results in a formatted collection 46 in which the documents 38 have been formatted into a common format to facilitate the task of searching for answers 36 to questions 12.

Constructing the database 22 includes passing the same document collection 38 through a feature extractor 48 which then extracts certain features that are to be used by a database builder 50 to build the database 22.

In some embodiments, the ingestor 42 ingests a database in its native form along with any metadata associated therewith. In such a case, the construction of the database 22 includes processing explicit database schema of an ingested database.

In still other embodiments, construction of the database 22 includes manually identifying relations shown in tables that are in documents that are to be ingested. This is accompanied by an optional step of applying standardized names for tables and fields.

For example, when ingesting documents in a particular domain, there may be certain relations that are commonly of interest. As an example of this type of domain-specific training, relations that are often of interest in the domain of financial documents include such things as "revenue by date." In such cases, the use of manual rule-based mapping to table and field name is a particularly effective feature of constructing the database 22.

Normally, one constructs a database 22 by defining a table in which each row corresponds to a record and each field corresponds to a column within that record. One then populates the rows and columns. This is carried out either by having a human enter the relevant information or by having a machine carry out an equivalent function. This uses a priori knowledge of what the table should look like.

In some cases, it is possible to infer a suitable database schema based on the content of the documents themselves. For example, if each document in the document collection refers to a particular type of capacitor as being rated for a particular voltage, one can infer a schema that includes rows for capacitor models and a column for voltage rating.

In the present case, such a priori knowledge may be missing. The source material for the database 22 is simply a document collection 38 that may include unstructured or minimally structured documents 40. The problem is therefore not unlike being given a stack of books and asked to somehow tabulate all the information in those books that is expected to be relevant to those who ask questions 12.

The feature extractor 48 identifies the specific features of the information that are expected to be of interest and extracts information indicative of those features from the documents 40 in the collection 38. The database builder 50 then inserts that information into an appropriate location within a table of a relational database 22.

The step of extracting features requires careful consideration of how a particular enterprise is likely to use the question-answering system 10. Because of the rudimentary state of artificial intelligence tools for carrying this out, the feature extractor 48 often requires human intervention.

As an example, for a document collection 38 that comprises resumés, it is reasonable to infer that the most important types of information would be a candidate's name, the candidate's skill set, the candidate's highest academic degree, and any languages, natural or otherwise, that the candidate is able to use. During a preparatory step, it is reasonable for the feature extractor 48 to extract these features from the documents 40. The database builder 50 would then define a schema in which there exists a row for each candidate and columns for each of the foregoing candidate features as identified by the feature extractor 48. This would enable them to be incorporated into distinct fields in the database 22.

The foregoing example, in which the documents 38 are resumes, is an example of a more general case in which each document 40 in the document collection 38 has a structure but the structures are not always quite the same. Thus, although the overall schema would be the same, the operation of extracting the same feature from each document 40 becomes sensitive to the particular structure of that document 40. In such cases, it is often more practical to have the feature extractor 48 carry out feature extraction by using custom defined rules, statistical models, or a combination thereof.

In some cases, the feature extractor 48 uses the knowledge base 24 way to extract features for use in constructing the database 22. In such cases, a human would hand-generate specific questions 12 that are then asked against each document 40 within a set of documents in the knowledge base 24.

As an example, an enterprise that is in the laptop manufacturing business may provide its sales staff with a knowledge base 24 that includes a set of n manuals, one for each of n laptop models. In such a case, one can anticipate that the members of the sales staff will often have to field questions about the technical capabilities of each laptop. In such cases, the feature extractor 48 would execute a step that includes, for each n, posing questions of the form "How much RAM does laptop "n" have?" The n answers that result would then be collected to form an n-row column in the database 22 with each row corresponding to one of the n laptops available.

The process of constructing the database 22 naturally has a subjective component of predicting in advance which features to collect. Thus, while one might expect sales staff to field questions about RAM or processor speed, one would not expect sales staff to field questions like, "Which of your laptops comes with an AC adapter?" or "Where does the lithium used in your laptop batteries come from?"

The extent to which this process is subjective can be reduced by maintaining statistics on the nature of questions being asked and using those statistics to predict what features the feature extractor 48 should be extracting.

In some cases, the database 22 includes a table with only one relation (i.e., each record/row of the table relating a value in one column with a corresponding value in a second column). This is particularly useful for a question-answering system 10 to be used by technical support staff. After all, much of what is carried out in technical support involves articulating a sequence of steps to fix some problem. More generally, records in a table may have more than two columns.

This makes it easy to answer a natural-language question 12 of the form "How many steps are there for replacing a graphics card?" To do so, the structured-query generator 18 would convert the natural-language question 12 into an equivalent structured query 20, such as "SELECT COUNT (step) FROM table-X," where "table-X" is the relevant table that contains the procedure for replacing the graphics card.

The record identifier for each cell in the column can also be used as a "step number." An example of this arises when the question 12 is of the form "What's the third step when replacing the graphics card?" In such a case, the structured-query generator 18 would generate a structured query 20 of the form: "SELECT step FROM table-X WHERE id=3."

Embodiments of the structured-query generator 18 include those that are obtained by a specialized model or set of models and those that are obtained by harnessing the power of a large language model, such as ChatGPT. Embodiments of the latter case include those in which the table schema and the natural language query are passed to the large language model along with the instruction to compose an SQL query for that schema which would answer the natural-language question.

Among those embodiments of the structured-query generator 18 that are obtained by a specialized model are those constructed by training several different sub-models. Each sub-model predicts a different aspect of the structured query 20 that is to be produced.

A useful model is one in which the structured query 20 makes a selection based on the intersection of plural conditions. Such a structured query 20 takes a form such as:
SELECT $aggregation($select_column) WHERE
{
($where_column1 $op1 $value1) AND ($where_column2 $op2 $value2) AND
.
.
($where_columnN $opN $valueN)
}

In some embodiments, the structured query 20 omits the "WHERE" clause.

The particular aggregation function to be used in the structured query 20 is predicted based on the output of a natural-language processor that receives the question 12. In some embodiments, the aggregation function arises from having used a classifier of the CLS tokens output by a BERT model.

Examples of suitable aggregation functions that are available in a typical structured query language include "MAX," "MIN," "COUNT," "SUM," and "AVG" as well as a null aggregator. For example, if the natural-language question 12 is of the form "What is the average exposure experienced by people who live within one and two miles of the Springfield Nuclear Power Plant?" the aggregation function selected is likely to be "AVG."

Another example of aggregation arises when one joins several relational tables from the database 22. For example, a natural language question of the form "What is the salary of the highest paid CEO for a company in Maine" would result in the structured-query generator 18 generating a structured query 20 that combines a "CEO-Salary" table, a "Company-CEO" table, and a "Company-State" table. An example of such a structured query 20 is: "SELECT MAX(Salary) FROM CEO-Salary, Company-CEO, Company-State WHERE State='Maine"). Similar aggregation functions (e.g., COUNT) and ordering functions (e.g., "SELECT TOP 1 . . . ORDER BY Salary") can also result from the natural language conversion.

The process of building the structured query 20 also includes predicting the column that the "SELECT" operator will operate on, i.e., the "operand" of the "SELECT" operator.

One method for doing includes de-lexicalizing training sentences and building a language model using a set of training questions. A useful set of training questions is that which is currently identified as the "WIKISQL" set of training questions.

When testing the model on a question 12, the process includes de-lexicalizing each word in the question 12 and observing the language model score assigned to each variation of that word. The variation with the highest such score is then used as a basis for selecting the operand of the "SELECT" operator, i.e., the column in the that is to be selected from the database 22 to respond to the question 12.

The illustrated structured query 20 includes N "WHERE" clauses, each of which has an associated condition. This condition is that of a particular column having a particular value. These too must be predicted by the structured-query generator 18.

In a preferred embodiment, the structured-query generator 18 predicts these conditions in much the same way as it predicted the aggregation function. In particular, the structured-query generator 18 uses a language model containing de-lexicalized values, the values of which are used to determine the particular column in the database 22 that is most likely to correspond to the questioner's intent, as gleaned from the question 12 itself.

As is apparent from the foregoing, information in documents 40 is sometimes found in tabular form. Some documents 40 are naturally tabular. Examples of such documents are spreadsheets.

Other documents 40 have tabular data that has been explicitly identified within the document. Examples include HTML files that use the "<table>" tag.

Still other documents 40 have tabular data that becomes identifiable as a result of having been processed into a visual form. In such cases, it is possible to extract the tabular data by using "visual segmentation." This includes organizing "chunks" of detected text within an image into a table. Such an organizing step includes assigning a type to each detected chunk of text and a structured query 20 to combine the processing of documents 40 with detection of structured data. This improves accuracy by automatically assigning a type to each chunk of text.

One approach to retrieval of tabular information is to "contextualize" cell content. An example of what it means to "contextualize" is to add a heading to a column and to a row of a table, thus making it possible to determine the meaning of a value in a particular cell.

For example, consider a table with column headings "CEO" and "Salary" and a row containing "Gaius Julius" under "CEO" and "$1,000,000." Such a row lends itself to being automatically transformed into an answer, such as: "CEO Gaius Julius has a salary of $1,000,000." As a result, a question such as "What is the CEO's salary?" would yield the answer "$1,000,000."

For those tables with more than two columns, it becomes possible to combine different pairs of columns to form different answers 36.

For example, consider a database 22 that also includes a third column labeled "Age." In such cases, it is possible to construct a two-factor contextualization based on the combination of the columns "Age" and "Salary." An answer 36 based on such contextualization would take the form of: "Age '55' has salary '$1,000,000.'"

Since the foregoing contextualization process can be carried out with two columns, it is not unreasonable to expect that it can also be carried out with larger numbers of columns. Thus, even a small table would be able to generate a large number of distinct combinations of columns to be used for forming different kinds of answers.

Another way to address retrieval of structured data uses a database lookup technique. This method is particularly useful for relational questions 12.

Using a database lookup makes it possible to leverage the capabilities of a typical structured query language (e.g., "SQL").

In some practices, a structured query 20 that corresponds to the foregoing question would take the form:

"SELECT Salary FROM Compensation-Table WHERE CEO='Gaius Julius'"

where the tabular information is assumed to be in a table called "Compensation-Table."

There are two parts to being able to use a database lookup technique to address such questions 12.

The first of the two parts is for the database builder 50 to form the underlying tables. This includes providing names of tables and names of columns, the latter corresponding to names of fields.

In some practices, forming the underlying tables is addressed by discovering table units in documents 40 and using ancillary information within the table, such as headings or captions to characterize the table names and/or column (or row) headings to characterize the field names. The most relevant table(s) will then be retrieved from all the identified tables. In addition, to improve the retrieval accuracy, the contextualization discussed above can be used.

The second of the two parts is for the structured-query generator 18 to map from a natural-language question 12 into a structured query 20. This typically includes identifying a suitable table with the correct fields in the database 22.

As an example, a structured-query generator 18 that receives a natural-language question 12 of the form "What is the 'X' of 'Y'?" would identify a table "T" having a field whose name "F" corresponds in some lexically plausible way to "X" and then finding a field "G" in which "Y" is a value. Having done so, the structured-query generator 18 generates a query of the form, "SELECT 'F' FROM 'T' WHERE 'G'='Y'."

Such matching of the question 12 to existing table and field names known to have been found in ingested documents can use a variety of techniques, including semantic similarity or question answering technology as well as by using techniques for converting a natural language question 12 into an equivalent SQL query to permit execution of complex queries.

In some practices, the structured-query generator 18 generates structured queries by using a mapping technique in which different clauses in the structured query represent different candidate answers. Each such clause would include a different column name. Examples of clauses that are common in a typical structured query language include the "SELECT" clause and the "WHERE" clause or equivalents thereof.

The structured-query generator 18 then retains the particular one of the clauses that best matches the original natural-language question. This query, with only the relevant one of the clauses remaining, is then used to search the database 22.

Figure 2:
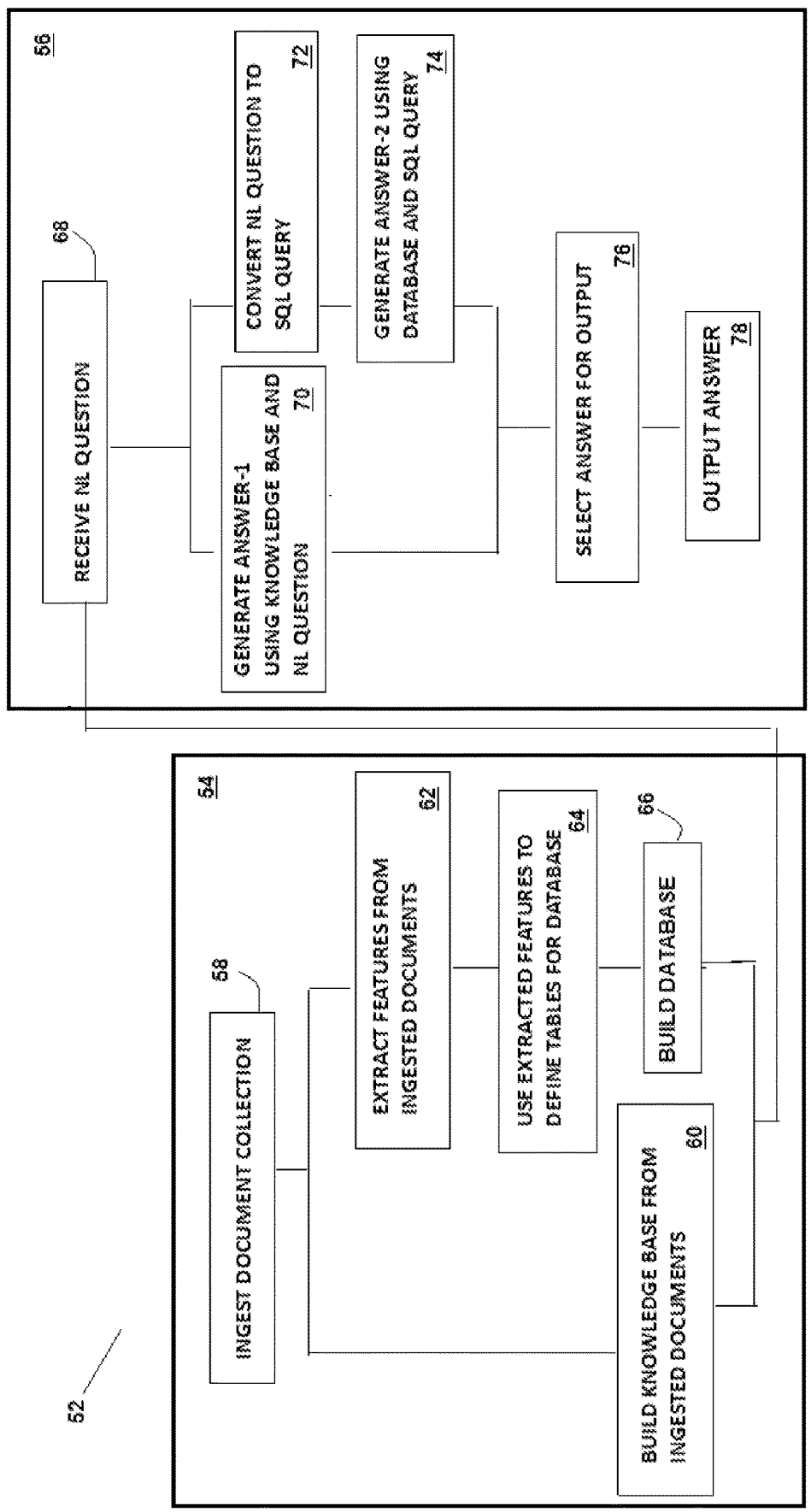
FIG. 2 shows a method carried out by the question-answering system of FIG. 1.

FIG. 2 shows a method 52 carried out by the question-answering system 10. The method includes a preparatory stage 54 and a run-time stage 56.

The preparatory stage 54 begins with the ingestion of a document collection 38 (step 58) that is then used to build the knowledge base 24 (step 60). The method 52 also includes extracting features from the same document collection 28 (step 62) and using those features to define tables for the database 22 (step 64) and to build that database (step 66).

The run-time stage 56 includes receiving a natural-language question 12 (step 68) and generating a first answer using the knowledge base 24 (step 70). In addition, the method includes converting that natural-language question 12 into a structured query 20 (step 72) and using that structured query 20 and the database 22 to generate a second answer. A choice is then made between the answers (step 74) and the chosen answer is provided as the output answer 46 (step 76).

Embodiments of the approaches described above in detail may be implemented in software, with computer instructions being stored on non-transitory machine-readable media. These instructions, when executed by one or more processors, implement the functions described above. The instructions may be at various levels, from machine-level instructions, to instructions for configuring an artificial-intelligence system.

Although particular embodiments have been disclosed herein in detail, this has been done by way of example for purposes of illustration only, and is not intended to be limit the scope of the invention, which is defined by the scope of the appended claims. Any of the features of the disclosed embodiments described herein can be combined with each other, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

The invention claimed is:

1. A method comprising a computer-implemented question-answering system carrying out the steps of:
receiving a document collection;
extracting features from documents in said document collection;
using said features to build tables in a database;
receiving a question, said question being a natural language question;
constructing a query corresponding to said question, said query being a query in a database query language;
providing said query to the database, said database having been constructed from documents in a document collection;
receiving information from said database in response to having provided said query thereto;
based on said information, generating a first answer to said question, wherein generating said first answer comprises causing said question to traverse a first path through said question-answering system, wherein the first path comprises a knowledge base constructed from content of the document collection using a machine learning BERT model;
causing said question to traverse a second path through said question-answering system to generate a second answer to said question, said second answer differing from said first answer, wherein the second path comprises a structured query generator and the database, the database being distinct from the knowledge base;
generating a score for said first answer, and generating a score for said second answer; and
selecting one of said first and second answers as an output answer based on said scores thereof.

2. A method comprising a question-answering system carrying out the steps of:
receiving a document collection, extracting features from documents in said document collection, and using said features to build tables in a database;
constructing said database, comprises using said question-answering system to direct a prior question towards each of said documents and, based at least in part on answers to said prior question, constructing a table for inclusion in said database, including using a natural language processing procedure to produce an answer to the prior question based on natural language content of said document;
receiving a first question, said question being a natural language question;
constructing a query corresponding to said first question, said query being a query in a database query language;
providing said query to the database, said database having been constructed from documents in a document collection;
receiving information from said database in response to having provided said query thereto;
based on said information, generating a first answer to said first question, wherein generating said first answer comprises causing said question to traverse a first path through said question-answering system, wherein the first path comprises a knowledge base constructed from content of the document collection using a machine learning BERT model; and
causing said question to traverse a second path through said question-answering system to generate a second answer to said question, said second answer differing from said first answer, wherein the second path comprises a structured query generator and the database, the database being distinct from the knowledge base.

3. The method of claim 2, wherein using the features to build tables in the database comprise building relational tables, and constructing the query corresponding to the first question comprises constructing a relational database query.

4. The method of claim 3, further comprising processing the relational database query in the database to yield a database response, and forming the information provided from the databased from said database response.

5. The method of claim 2, wherein the prior question is one of a plurality of prior questions that are directed to each of said documents and known prior to receiving the document collection.

6. A method comprising a question-answering system carrying out the steps of:
receiving a question, said question being a natural language question,
constructing a query corresponding to said question, said query being a query in a database query language,
providing said query to a database, said database having been constructed from documents in a document collection,
receiving information from said database in response to having provided said query thereto,
based on said information, generating a first answer to said question, wherein generating said first answer comprises causing said question to traverse a first path through said question-answering system, wherein the first path comprises a knowledge base constructed from content of the document collection using a machine learning BERT model, and
causing said question to traverse a second path through said question-answering system to generate a second answer to said question, said second answer differing from said first answer, wherein the second path comprises a structured query generator and the database, the database being distinct from the knowledge base.

7. The method of claim 6, wherein said question-answering system carries out the further steps of causing said question to traverse a first path to generate said first answer and causing said question to traverse a second path to generate a second answer that differs from said first answer.

8. The method of claim 6, wherein said documents are human-readable documents.

9. The method of claim 6, wherein said documents are natural-language documents.

10. The method of claim 6, wherein said question-answering system carries out the further step of constructing said database based on said documents, wherein constructing said database comprises constructing a relational database.

11. The method of claim 6,
wherein generating said first answer comprises causing said question to traverse a first path through said question-answering system and
wherein said question-answering system carries out the further steps of:
generating a score for said first question,
causing said question to traverse a second path through said question-answering system to generate a second answer to said question, said second answer differing from said first answer,
generating a score for said second question, and
selecting one of said first and second questions as an output answer based on said scores thereof.

12. The method of claim 6, wherein said question-answering system carries out the further step of: constructing said database based on said documents, wherein constructing said database comprises constructing a schema for said database based at least in part on said documents.

13. The method of claim 6, wherein said question-answering system carries out the further step of generating a second answer to said question, said second answer differing from said first answer.

14. The method of claim 6, wherein said question-answering system carries out the further step of compiling a knowledge base based on said document collection and using said knowledge base to provide a second answer to said question.

15. The method of claim 6, wherein said question-answering system carries out the further step of receiving a second answer to said question, said second answer being different from said first answer and rejecting one of said first and second answers.

16. The method of claim 6, wherein said question-answering system carries out the further step of receiving said document collection, extracting features from documents in said document collection, and using said features to build tables in said database.

17. The method of claim 6, wherein said question-answering system carries out the further step of: constructing said database, wherein constructing said database comprises using said question-answering system to direct a question towards each of said documents and, based at least in part on answers to said questions, constructing a table for inclusion in said database.

18. The method of claim 6, wherein said question-answering system carries out the further step of constructing said database, wherein constructing said database comprises identifying a table in said documents and incorporating said table into said database.

19. The method of claim 6, wherein generating said first answer comprises causing said question to traverse a first path through said question-answering system, and wherein said question-answering system carries out the further step of generating a score for said first question, causing said question to traverse a second path through said question-answering system to generate a second answer to said question, said second answer differing from said first answer, generating a score for said second question, and selecting one of said first and second questions as an output answer based on said scores thereof.

* * * * *